United States Patent [19]

Bongart

[11] Patent Number: 4,996,769
[45] Date of Patent: Mar. 5, 1991

[54] METHOD OF FITTING A BUTTERFLY VALVE ON A SLOTTED SHAFT

[75] Inventor: Marcel Bongart, Aviron, France
[73] Assignee: Solex, France
[21] Appl. No.: 469,069
[22] Filed: Jan. 23, 1990

[30] Foreign Application Priority Data

Jan. 31, 1989 [FR] France .................. 89 01186

[51] Int. Cl.⁵ .................................. B21D 53/00
[52] U.S. Cl. ........................ 29/888.46; 29/407; 29/434; 29/890.124
[58] Field of Search ............ 29/525.1, 525, 464, 29/434, 407, 888.46, 890.124; 251/305, 306, 307, 308

[56] References Cited

U.S. PATENT DOCUMENTS

| | | | |
|---|---|---|---|
| 1,167,145 | 1/1916 | Baverey | 251/305 |
| 1,841,695 | 1/1932 | Anderson | 251/308 |
| 1,857,477 | 5/1932 | Ritter | 251/308 |
| 2,705,343 | 1/1938 | Briggs | 251/308 |
| 3,176,704 | 4/1965 | De Palma | 251/305 |
| 3,951,405 | 6/1976 | Robinson | 29/434 |
| 4,266,753 | 5/1981 | Okada | 251/305 |
| 4,420,438 | 12/1983 | Goosen | 251/305 |
| 4,561,158 | 12/1985 | Johnson et al. | 29/888.46 |
| 4,621,790 | 11/1986 | Balter | 29/157.1 R |

Primary Examiner—Howard N. Goldberg
Assistant Examiner—I Cuda
Attorney, Agent, or Firm—Larson and Taylor

[57] ABSTRACT

A method is provided for fitting a butterfly valve on the slotted shaft of a carburetor body. The slot is first of all oriented parallel to the axis of the duct. Then one edge of the butterfly valve is gripped by a gripping member and is inserted as far as its final position by moving the member along the axis of the duct. The unit formed by the butterfly valve and the shaft is rotated as far as the position in which the butterfly valve closes the duct by exerting a force with the gripping member and a retaining torque with a motor.

6 Claims, 1 Drawing Sheet

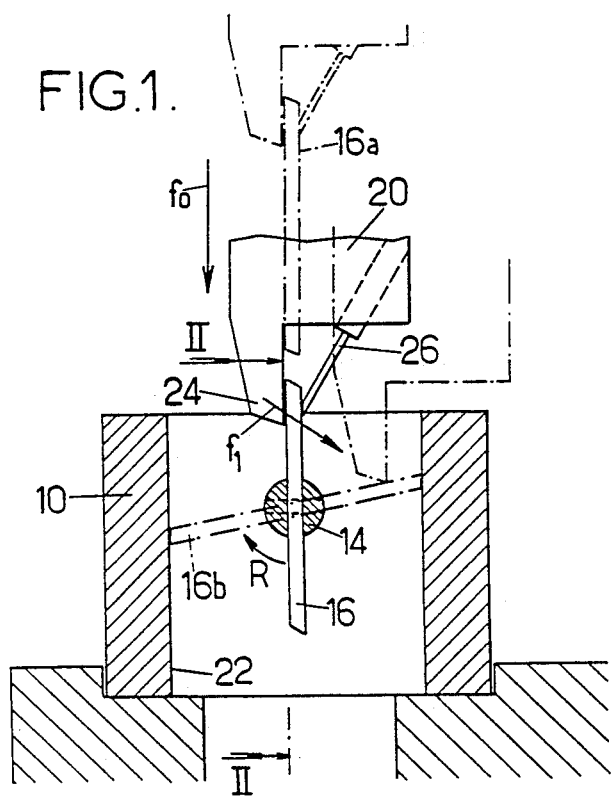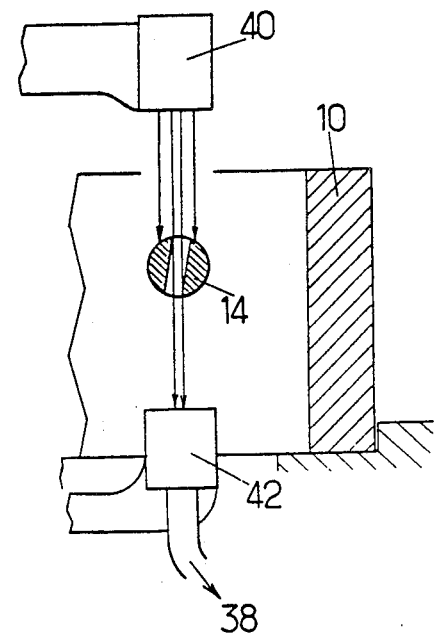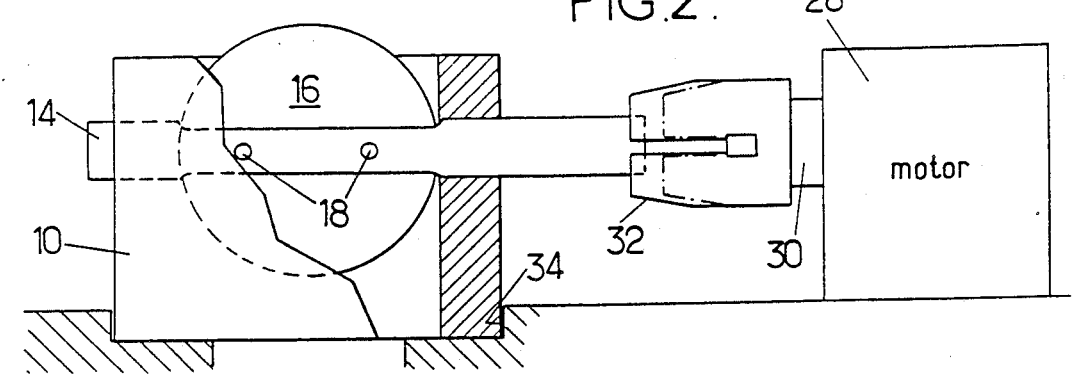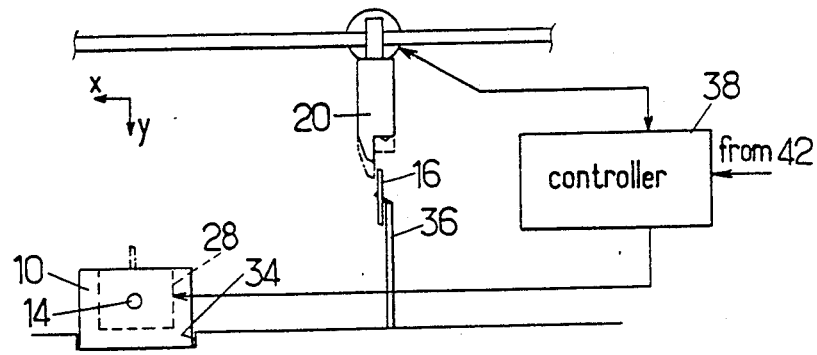

METHOD OF FITTING A BUTTERFLY VALVE ON A SLOTTED SHAFT

BACKGROUND OF THE INVENTION

1. Field of the Invention

The invention relates to assembling a butterfly valve and a rotary shaft which passes through a duct and in which a slot is formed for receiving the butterfly valve. It is particularly although not exclusively suitable for use in the fitting of butterfly valves forming a restriction member in fuel supply devices for internal combustion engines.

The intake ducts of such engines generally comprise a butterfly valve controlled by the driver for metering the flow rate of an air/fuel mixture delivered to the engine. Many carburetors further comprise a second butterfly valve, forming a starting choke and which is placed in the air intake of the carburetor and whose purpose is to increase the fuel/air ratio of the mixture delivered to the engine during a cold start.

2. Prior Art

Sometimes, the butterfly valve is fastened by screws on a flat formed on the shaft. Much more often, the butterfly valve is placed in a slot formed through the shaft and it is held in position by screws passing through the shaft and the butterfly valve or by resilient projections of the valve (U.S. Pat. Nos. 2,105,343 and 1,841,695).

At first sight, the fitting of the butterfly valve seems a simple operation. In fact, it is difficult, particularly because the clearance between the butterfly valve and the walls of the slot must be very small (a few hundredths of a millimeter) to avoid air leaks through this gap. To fit the butterfly valve, the shaft must first of all be indexed so that the slot is parallel to the axis of the duct, then the butterfly valve must be inserted over the required height and finally the shaft-butterfly valve units is rotated while preventing the butterfly valve from sliding in the slot, as far as the closed position in which the fastening screws are inserted. Up to now, the butterfly valve has been inserted in the correct position and then held in position by hand while the shaft is rotated.

SUMMARY OF THE INVENTION

An object of the invention is to provide a method of fitting the butterfly valve using a robot, without manual intervention.

For that, the invention provides in particular a method of fitting wherein, after the shaft has been indexed so that the slot is parallel to the axis of the duct:

an edge of the butterfly valve is clamped with a gripping member and the gripping member is moved along a path for radial insertion of the butterfly valve in the slot as far as its final position with respect to the shaft, and the unit formed by the butterfly valve and the shaft is rotated to the position in which the butterfly valve closes the duct, by simultaneously controlling a motor driving the shaft and applying an abutment force with the gripping member on said edge whereby the friction forces prevent the butterfly valve from sliding during rotation of the shaft to the closure position of the butterfly valve. The latter then remains in the position where it was placed.

In practice, it is generally necessary to control the gripping member so that it exerts on the butterfly valve a force which is so directed as to bias the butterfly valve toward its closure position and to control the motor so that it exerts a resistive torque: in fact, the inertia of the means driving the gripping member of the robot makes this procedure more advantageous. The motor (of low inertia) is better adapted for exerting a resistive torque which yields under the action of the force exerted by the gripping member.

In an advantageous embodiment of the invention, the arrival of the butterfly valve in the position in which the slot is parallel to the axis of the duct is controlled or checked before insertion. This operation may be carried out by rotating the shaft until a light flux received by a receiver aligned with a light source along the insertion direction is maximum.

The invention will be better understood from the following description of a particular embodiment of the invention, given by way of example.

BRIEF DESCRIPTION OF THE DRAWINGS

The description refers to the accompanying drawings, in which:

FIG. 1 shows a butterfly valve body in cross-section through a plane passing through the axis of the duct which is formed therein and the path followed by the butterfly valve during insertion thereof and rotation of the shaft to its closure position;

FIG. 2 shows schematically, in partial cross-section through line II of FIG. 1, the butterfly valve body and the means for indexing and exerting a resistive torque on the shaft;

FIG. 3 is a general diagram of a circuit for controlling the element gripping the butterfly valve and of means for exerting a torque on the shaft of the butterfly valve; and FIG. 4, similar to FIG. 1, is a diagram showing a preliminary shaft indexing step before insertion of the butterfly valve.

DETAILED DESCRIPTION OF A PREFERRED EMBODIMENT

Referring to FIG. 1, a butterfly valve of generally conventional design comprises a body 10 of tubular, general oval, shape. The body carries a rotary shaft 14 in which is formed a radial slit for receiving a butterfly valve 16 in the form of a disk. Holes 18 are provided for screws fastening the butterfly valve.

Such a butterfly valve is used particularly in a carburetor where it is generally secured downstream of a fuel supply unit. It can also be used in an injection supply device where it is located between pipe sections.

A description will now be given of the successive operations which take place when assembling the butterfly valve, using a robot having a gripping member 20 carried by means (not shown), which may be conventional, for moving member 20 into orthogonal directions x and y (FIG. 3). In the following, it will be assumed that direction y is parallel to the axis of duct 22 formed in the body and that direction x is orthogonal to y, the two directions defining a plane perpendicular to the shaft 14.

The gripping member 20 must have a shape such that it may carry out the necessary movements of the butterfly valve without being hindered by body 10. To this end, member 20 shown schematically in FIGS. 1 and 3 is in the form of a finger elongated in direction y and having an extension 24 intended to contact the surface of the butterfly valve 16, on the rear edge in the direction of engagement of the butterfly valve in the shaft. Means must be provided for clamping the butterfly valve against the extension 24. As illustrated in FIG. 1, they consist of a rod 26 which is movable between an extended position in which it forcibly applies the butterfly valve against extension 24 and a retracted position in which it releases the butterfly valve. Rod 26 may be controlled by fluid pressure or electromagnetic means. With extension 24, it forms a clamp gripping the edge of the butterfly valve.

As mentioned above, implementation of the method requires a motor for exerting a torque on shaft 14. In the embodiment shown in FIG. 2, motor 28 is mounted on a base in which a recess is formed for centering body 10. The motor comprises a rotary shaft 30 having a chuck 32 which can be moved, by appropriate means (not shown), between a front position in which it covers the end of shaft 14 when the body is placed in the recess and a retracted position (shown with broken lines) in which it releases the shaft.

Before fitting a butterfly valve, body 10 is placed, possibly by a robot, in recess 34 with shaft 14 oriented so that the slit is parallel to the axis of duct 22. The butterfly valve 16 to be inserted is on a support 36 formed so as to clear the open edge of the butterfly valve. Fitting then takes place as follows. By moving it in directions x and y, the gripping member 20 is brought to the position shown in broken line in FIG. 3, in which the end portion of extension 24 is against the upper edge portion of the butterfly valve, rod 26 being retracted. The means for controlling rod 26 are actuated and the latter clamps the upper edge of the butterfly valve against extension 24.

Member 20 is then moved so as to remove the butterfly valve 16 from its support then to bring it just above the slit in shaft 14, into the position illustrated with a dash-dot line and designated with 16a in FIG. 1. The gripping member 20 is lowered along the path shown by arrow $f_0$ to insert the butterfly valve over a suitable distance. The movements of the member may be controlled by a programmable controller 38, the movements having been programmed once for all responsive to the relative position of support 36 and of recess 34 in the base.

During this insertion, motor 28 is advantageously controlled so as to retain shaft 14 against rotation in the suitable angular position.

Once the butterfly valve is in the position shown with a continuous line in FIG. 1, motor 28 is energized to exert a torque tending to rotate shaft 14 in the direction opposite the closure direction R ( FIG. 1) of the butterfly valve. The purpose of the torque is to exert a force jamming butterfly valve 16 in the slot. With the butterfly valve thus jammed, rod 26 is retracted and the gripping member 20 is moved in the direction of arrow $f_1$ so as to push the butterfly valve, by a simple abutting force, close to its closure position designated with 16b (FIG. 1). Up to that moment, the force exerted by the gripping member must be sufficient to overcome the resistive torque exerted by motor 28. The friction due to jamming of the butterfly valve 16 in the slot prevents any sliding of the butterfly valve. When the latter has reached a position close to its closure position, energization of motor 28 is reversed and shaft 14 drives the butterfly valve to the closure position in which it is automatically centered. Since the torque exerted by the motor is small, there is no risk of deformation.

It is then possible to remove the gripping member and, in its place, to introduce a screw driver for inserting and tightening the screws providing final locking. Chuck 32 is retracted clear of the shaft. The body, containing its butterfly valve, may be withdrawn possibly using a robot which was used for bringing it and it is transferred to the next station in the carburetor or injection device assembly line.

The arrival of butterfly valve 16b in the position where it bears against the body may be detected in different ways, particularly by measuring the force exerted on the gripping member 20: the arrival of the butterfly valve in that position results in an increase of the force transmitted to the butterfly valve without an associated movement of the latter. The gripping member 20 is advantageously mounted so as to have a certain degree of compliance which promotes correct insertion.

Advantageously, the method comprises a preliminary step of indexing shaft 14 so as to bring the slot in the direction of insertion of the butterfly valve. For that, a measuring apparatus may be used of the kind shown schematically in FIG. 4. This apparatus comprises a light source 40 delivering a parallel beam, and a receiver 42 both aligned along the axis of duct 22. During a preliminary phase, when chuck 32 has already been coupled to shaft 14, source 40 and receiver 42 are brought into the measuring position shown in FIG. 4. The source is designed to deliver a parallel light beam whose transverse size is less than the diameter of shaft 14. By means of the automatic device 38, the motor 28 is controlled so as to oscillate shaft 14 until receiver 42 receives a maximum light flow.

With an apparatus of the kind shown in FIG. 4, it is further possible, if required, to determine the exact position of the slot in direction x, by oscillating the measuring apparatus along axis x and by computing the middle of the substantially constant illumination zone. This position may be stored in a memory by the programmable controller 38 which controls the movement of the gripping member 20 in direction x in response.

Numerous modifications of the invention regarding not only the sequence of operations to be carried out but also to the nature of the means used are possible. For example, the gripping member may comprise, in the zone of extension 24 which is to be applied onto the butterfly valve, recesses connectable to a vacuum source so as to form a suction device.

It should be understood that the scope of the present patent extends to such modifications as well as generally to all others remaining within the scope of the claims.

I claim:

1. Method of assembling a flat butterfly valve of disk shape and a rotary shaft which passes through a duct having an axis and is formed with a slot sized for receiving the butterfly valve, comprising the steps of:
   (a) indexing the shaft so that the slot is parallel to the axis of the duct;
   (b) clamping an edge portion of the butterfly valve with a gripping member and moving the gripping member along a path selected for radial insertion of the butterfly valve into the slot to its final position with respect to the shaft;
   (c) rotating a unit formed by the butterfly valve and the shaft to a position in which the butterfly valve closes the duct, by simultaneously controlling a motor driving the shaft and applying an abutment force on said edge portion with the gripping member whereby the butterfly valve is frictionally prevented from sliding in the slot during rotation of the shaft to the closure position of the butterfly valve; and (d) fastening the butterfly valve to the shaft.

2. Method according to claim 1, wherein, during step (c), the gripping member is controlled to exert on the butterfly valve a force which is directed to bias the butterfly valve toward its closure position and the motor is controlled to exert a resistive torque.

3. Method according to claim 1, wherein, during step (b), the butterfly valve is clamped between an extension of said gripping member and means movable between an extended position where it clamps the butterfly valve and a retracted position.

4. Method according to claim 2, wherein, during step (b), the butterfly valve is clamped by generating a vacuum between said butterfly valve and the gripping member.

5. Method according to claim 2, wherein step (a) includes:

temporarily locating a light source and a light sensor on opposite sides of the shaft, said light source and light sensor being aligned along the axis of the duct, and rotating the shaft until the sensor receives a maximum amount of light flux through the slot from the light source.

6. Method of assembling a flat butterfly valve of disk shape and a rotary shaft which passes through a duct having an axis formed in a butterfly valve body of a fuel delivery device for an internal combustion engine, said rotary shaft being formed with a slot sized to receive the butterfly valve, comprising the steps of:

(a) rotating the shaft with servo-controlled means responsive to the position of the slot until the slot is indexed parallel to the axis of the duct;

(b) clamping an edge portion of the butterfly valve with a gripping member of a robot and automatically moving the gripping member along a predetermined path selected for final radial insertion of the butterfly valve in a direction parallel to the duct axis into the slot to its final position with respect to the shaft;

(c) controlling the robot for applying an abutment force on said edge portion for biasing said butterfly valve to its closure position and simultaneously controlling the servo-motor to exert a resistive torque, whereby the unit formed by the butterfly valve and the shaft is rotated to the closure position of the butterfly valve and the butterfly valve is frictionally prevented from sliding along the slot; and (d) fastening the butterfly valve to the shaft by inserting screws into mutually aligned holes in the butterfly valve and shaft.

* * * * *